3,822,271
METHYLATION PROCESS
Seymour J. Lapporte, Orinda, Calif., assignor to Chevron Research Company, San Francisco, Calif.
No Drawing. Filed Mar. 19, 1971, Ser. No. 126,303
Int. Cl. C07c 1/12; C07d 31/20
U.S. Cl. 260—290 R           7 Claims

ABSTRACT OF THE DISCLOSURE

Alkyl substituted benzenes, aniline, and pyridine and alkyl substituted aniline and pyridine compounds are methylated by a mixture of carbon dioxide and hydrogen in a reaction catalysed by hydrogen reduced oxides or borides of cobalt and/or nickel. Reaction conditions include a temperature in the range 150–450° C. and a pressure in the range 1.7 to 70 atmospheres.

BACKGROUND OF THE INVENTION

This invention relates to a novel process for the methylation of certain mononuclear aromatic compounds. It relates in particular to the methylation of alkyl substituted benzene hydrocarbons by a mixture of carbon dioxide and hydrogen in the presence of a catalyst.

PRIOR ART

In the chemical art the production of useful compounds by the methylation of an aromatic feed is well known. Methanol, methyl chloride, methyl ether and formaldehyde are the usual agents employed in a reaction facilitated by a Friedel-Craft catalyst. These reactions characteristically result in products which are more or less of the thermodynamic equilibrium distribution. For example, in an ordinary methylation of toluene, the resulting xylene mixture approximates the xylene equilibrium mixture.

THE INVENTION

It has now been found that alkyl substituted benzene hydrocarbons, pyridine and aniline and alkyl substituted pyridine and aniline are methylated by a mixture of the gases carbon dioxide and hydrogen in a reaction carried out in the presence of a Fischer-Tropsch catalyst at a temperature in the range 150–450° C., preferably 200–300° C., and at a pressure in the range 1.7 to 70 atmospheres, preferably 5 to 50 atmospheres. For each mol of the methylatable compound feed an amount of carbon dioxide in the range 0.5 to 50, preferably 20–40, mols should be present in the reaction mixture and methylation of the feed results provided that the hydrogen to carbon dioxide mol ratio in the mixture ies less than about 3 to 1, preferably less than 2.5 to 1, and greater than 1 to 1. The reaction may be summarized as follows:

(a) 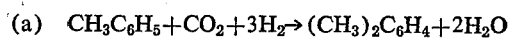

$$CH_3C_6H_5 + CO_2 + 3H_2 \rightarrow (CH_3)_2C_6H_4 + 2H_2O$$

which suggests a hydrogen to carbon dioxide mol ratio of 3 to 1. Surprisingly, when this stoichiometric ratio and higher is employed, little or no methylation results, and the product, for all practical purposes, is what is expected from a conventional hydrogenation. That is, the aromatic nucleus is saturated and/or hydrogenolysis of nuclear substituents, if present, occurs.

The reaction mechanism is not known but a number of unique features have been discovered. Alkyl substituted benzene methylates in the meta or para positions when available, otherwise methylation occurs by replacement of an α-hydrogen atom. On the other hand, methylation of pyridine and aniline occurs at the ortho positions rather than at the meta and para positions as in the case of alkyl substituted benzenes. Thus, a feature of the invention is the non-thermodynamic specificity of the catalyst:

(1) alkylbenezene feeds in general yield the more useful meta and para isomeric products as well as some side-chain alkylation product; and
(2) aniline and pyridine feeds yield methylation products in which the methyl group is largely located in the ortho position relative to the nitrogen atom of the feed compound.

Thus, the process yields, for example, m- and p-xylene in the case of a toluene feed, α-picoline from pyridine, mesitylene from m-xylene, o-toluidine from aniline, and 1-ethyl-4-methylbenzene from p-xylene. The methyl substituted products obtained in the subject process are especially useful for the production of the corresponding carboxylic acids, for example isophthalic, terephthalic, and α-picolinic acids.

PREFERRED EMBODIMENT

The process is conveniently carried out in a continuous manner by introducing a gaseous mixture of the reactants into contact with a Fischer-Tropsch catalyst in the fixed bed form. For example, vaporized toluene, carbon dioxide and hydrogen in a mol ratio of 1 to about 40 and 30, respectively, is passed into contact with a cobalt-thoria-magnesium oxide catalyst composite in a reaction zone maintained at about 250° C. at a pressure of about 10 atmospheres, and with a contact time of about 12 minutes. The effluent product stream is separated by conventional distillation means and the unconverted feed components are recycled to the reaction zone together with makeup feed.

The catalysts useful in the practice of the invention are, in general, the solid nickel and/or cobalt containing Fischer-Tropsch catalysts known in the art (cf "Fischer-Tropsch and Related Syntheses" by H. H. Storch, N. Columbic and R. B. Anderson, John Wiley & Sons, N.Y., N.Y. (1951). The finely divided or pelleted hydrided (hydrogen treated) metal(s) per se, their borides or these materials disposed upon inert or oxide promoter-type carriers, are satisfactory.

In the preparation of the catalyst by ordinary means, the metal oxide precursor is reduced by treatment with hydrogen at an elevated temperature and such a pre-reduction of the catalyst precursor, in contrast with an in situ reduction in the presence of a methylation reaction mixture, gives in general a more active catalyst. For example, a cobalt or nickel oxide or a mixture of these oxides is heated to a temperature in the range 300 to 500° C. in an atmosphere of hydrogen or hydrogen plus an inert gas such as nitrogen, and the heating is continued until little or no water is produced by further treatment.

In the case of the employment of supported cobalt and/or nickel catalysts, the amount of the active metal in the composite may vary widely and amounts of the active component in the range 0.5 to 75 weight percent and higher may be used. Ordinarily amounts of the active component in the range 5 to 60 weight percent of the composite are most satisfactory. Thus, in addition to the active cobalt and/or nickel catalyst component, the catalyst may contain or be disposed upon an inert carrier material such as magnesia, kieselguhr, the processed diatomaceous earths (Kieselguhr) of commerce, silica, thoria, alumina, zirconia, titania, and the like.

The ratio of catalyst to aromatic feed to be methylated is generally not critical and may vary widely within the scope of the invention depending upon whether a batch or continuous reaction system is employed. Broadly weight ratios of catalyst to feed between about 1:1000 and about 10:1 or an LHSV in the range between about .01 to 100 are found to be satisfactory; higher or lower catalyst to feed ratios may, however, be used within the scope of the invention.

Alkyl substituted benzene hydrocarbons, aniline, pyridine, and substituted aniline and pyridine compounds in which one or more nuclear (i.e., bonded to a carbocyclic aromatic carbon atom) hydrogen atoms are replaced by alkyl groups are, in general, methylatable by the subject process and are contemplated for use herein as process feeds. Preferred process feeds are those which contain at least one compound selected from compounds of the formula $C_6H_{5-m}(CH_3)_mR$, $C_6H_{5-(m+n)}(NH_2)(CH_3)_mR_n$, and $C_5H_{5-(m+n)}N(CH_3)_mR_n$, in which R is an alkyl group which has a carbon atom content in the range from 1 to about 12, preferably 1, and $m$ and $n$ are the same or different and are 0 or 1. Of these, the alkylbenzenes and pyridine feeds are the most preferred.

Representative process feeds useful in the practice of the process of the invention include toluene, ethylbenzene, 1-dodecylbenzene, isopropylbenzene, tertiary-butylbenzene, s-butylbenzene, undecylbenzene, m-xylene, p-xylene, o-xylene, 4-ethylmethylbenzene, 3-methyl-(2-dodecyl)-benzene, 4-methyl-t-butylbenzene, 3-methylisopropylbenzene; aniline, o-toluidine, m-toluidine, p-toluidine; 3-ethylaniline, 4-n-dodecylaniline, 2,3-dimethylaniline, 2-(2-dodecyl), 4-methylaniline, 3,4-dimethylaniline, 3-methyl-4-octylbenzene; pyridine, 2-methylpyridine, 2-methyl-4-butylpyridine, 2-methyl-4-octylpyridine, 2,3-dimethylpyridine, 2,5-dimethylpyridine, 4-(2-dodecyl)-pyridine, 2,6-dimethylpyridine, 4-dodecyl-2-methylpyridine, and the like process feed compounds and mixtures of these compounds.

REPRESENTATIVE CATALYST PREPARATIONS

I. Composite: Nickel-Thoria Oxides on Kieselguhr

The components and amounts (all parts by weight):

Nickel nitrate hexahydrate _____ 99.0
Thorium nitrate tetrahydrate _____ 7.5 were dissolved in 500 parts of boiling distilled water, and to it was rapidly added a boiling solution of 57.5 parts of potassium carbonate in 500 parts of distilled water followed by 20 parts of commercial grade diatomaceous earth. The resulting solid composite of nickel oxide-thorium oxide-diatomaceous earth, a catalyst precursor, was exhaustively washed with distilled water until the filtrate had a neutral pH value. The dried (110° C., overnight) solid contained (calculated) per 100 parts, 51.9 parts of nickel oxide, 7.3 parts of thorium oxide, and 40.8 parts of kieselguhr.

II. Composite: Co-ThO₂-MgO on Kieselguhr

A composite as in Item (I) above was prepared except that the materials and relative amounts were (parts by weight):

Cobalt nitrate hexahydrate _____ 98.8
Thorium nitrate tetrahydrate _____ 2.1
Magnesium nitrate hexahydrate _____ 10.2
Sodium carbonate _____ 52
Kieselguhr _____ 40 and dried in a vacuum oven at 115° C. The hydrogen reduced composition had the composition (calculated) by weight:

| | Percent |
|---|---|
| Cobalt | 32.0 |
| Thorium oxide | 1.6 |
| Magnesium oxide | 2.6 |
| Kieselguhr | 63.8 |

III. Composite: Cobalt Boride on Diatomaceous Earth

A cobalt boride catalyst disposed upon diatomaceous earth was prepared by adding a solution of 7.6 parts of sodium borohydride in 200 parts of outgassed water to a slurry of 6.2 parts of diatomaceous earth in a solution of 13.5 parts of cobalt acetate tetrahydrate dissolved in 500 parts of water. When gas evolution had ceased, the black solid resulting from the interaction of the reactants and support were filtered and washed with 5 separate 100 part portions of degassed water. The drying of catalyst was effected in a dessicator at room temperature under a reduced pressure, i.e., about 0.1 mm. of Hg.

The following examples further illustrate the invention.

Examples 1–4

In these examples a catalyst precursor composite—10 cc., 5.2 grams—prepared as in II above was charged to a continuous fixed bed process unit fitted for temperature control and operation under superatmospheric pressures including a controlled introduction of the reactants and withdrawal of the resulting product stream. The unit was a stainless steel tube having aluminized interior walls. The reactor and charge was heated to about 360° C. and the catalyst precursor charge was converted to the activated catalyst (cobalt metal and/or metal hydride) by following a stream of hydrogen gas under a pressure of about 11 atmospheres through the catalyst bed (about 24 cc. of hydrogen per gram of the oxide composite per minute) for a period of about 16 hours. The process parameters were varied with the results as noted in Table I.

TABLE I

Fixed bed methylation of toluene with $CO_2$ and $H_2$
Toluene flow=1 ml./hr.
Reactor pressure=150 p.s.i.

| Run number | 1 | 2 | 3 | 4 |
|---|---|---|---|---|
| CO₂ flow, ml./min | 173 | 110 | 116 | 110 |
| H₂ flow, ml./min | 127 | 133 | 240 | 133 |
| CO₂/H₂ ratio | 1.36 | 0.97 | 0.48 | 0.97 |
| Temperature, °C | 250 | 350 | 350 | 450 |
| Run time, hours | 64 | 6.75 | 16 | 1.5 |
| Toluene conversion | 18 | 0.5 | 1.6 | 2.8 |
| Products, percent: | | | | |
| Benzene | 6.7 | Trace | 22.3 | 76.2 |
| Methylcyclohexane | 62.3 | 27.6 | 35.7 | 2.7 |
| Ethylbenzene | 3.1 | 11.8 | 12.1 | 3.9 |
| m- and p-Xylene | 16.9 | 60.7 | 27.4 | 17.2 |
| o-Xylene | 1.7 | Trace | 2.5 | Trace |

EXAMPLE 5

A cobalt Fischer-Tropsch catalyst prepared as in Examples 1–4 and toluene were charged to a batch-type pressure reactor unit connected to a $CO_2$–$H_2$ gas reservoir. The weight ratio of the catalyst to hydrocarbon feed was 1:9.2, respectively. The sealed unit and contents was maintained at a temperature of about 200° C. under a constant pressure of 11 atmospheres of a 1:1 $CO_2$–$H_2$ mixture for 20 hours. The reactor was cooled and the uncondensed gases were vented and analysed:

| | Mol Percent |
|---|---|
| Carbon dioxide | 52.5 |
| Methane | 26.7 |
| Hydrogen | 20.8 |
| Carbon monoxide | 0 |

Analysis of the liquid product by gas chromatography indicated that 3% of the toluene had been converted and that the product distribution by weight was:

| | |
|---|---|
| Benzene | 9.9 |
| Methylcyclohexane | 26.9 |
| Ethylbenzene | 12.2 |
| m- and p-xylene | 51.0 |

Example 6

Example 5 was repeated except that:

(1) pyridine replaced toluene as the feed;
(2) the weight ratio of catalyst to feed was 1:8;
(3) the temperature was 230° C.; and
(4) the reaction time was 21 hours.

The analysis indicated that 3 percent of the pyridine had been converted and that there was a 32 weight percent yield of 2-picoline.

Example 7

Example 6 was repeated except that the cobalt catalyst was replaced by a nickel-thoria on kieselguhr composite.

The analysis indicated that the conversion of pyridine was 4.3 percent and that the yield of 2-picoline was 88 percent.

Example 8

Example 5 was repeated except that:

(1) the toluene was replaced by ethylbenzene; and
(2) the temperature was 200° C.

The liquid product molar distribution was as follows:

Ethylcyclohexane _____ 37.7
Toluene _____ 43.8
Isopropylbenzene _____ 2.2
n-propylbenzene _____ 0.4
p-ethyltoluene _____ 2.9
m-ethyltoluene _____ 3.9
o-ethyltoluene _____ 0.2

Example 9

Example 5 was repeated except that:

(1) the feed was aniline;
(2) the temperature was 250° C.; and
(3) the time was 10 hours.

The analysis indicated that there had been a 30 percent conversion of the feed, and the liquid product was as follows:

| | Weight Perceent |
|---|---|
| Benzene | 38 |
| 2-methylaniline | 15 |
| Higher boiling materials | 47 |

In addition some ammonium carbonate was noted.

Example 10

Example 9 was repeated except that:

(1) the feed was o-xylene;
(2) the temperature was 225° C.;
(3) the reaction time was 19 hours; and
(4) weight ratio of catalyst to hydrocarbon feed was 1:10.6.

The conversion was 6.8 percent, and the product was:

| | Weight Percent |
|---|---|
| Trans-1,2-dimethylcyclohexane | 41.9 |
| Cis-1,2-dimethylcyclohexane | 31.2 |
| Toluene | 10.7 |
| 1,2,4-trimethylbenzene | 11.8 |
| 1,2,3-trimethylbenzene | 0 |
| Benzene | 0 |
| o-Ethyltoluene | 0 |

Example 11

Example 10 was repeated except that the feed was p-xylene. The conversion was 16.6% and the product was:

| | |
|---|---|
| Methylcyclohexane | 9.6 |
| Trans-1,4-dimethylcyclohexane | 16.6 |
| Cis-1,4-dimethylcyclohexane | 9.7 |
| Toluene | 51.7 |
| p-Ethyltoluene | 7.9 |
| Other | 4.5 |

Example 12

Example 10 was repeated except:

(1) the catalyst was cobalt boride disposed upon diatomaceous earth; and
(2) the reaction time was 21 hours.

The conversion was 6.4 percent and the yield of 1,2,4-trimethylbenzene was 4.1 percent. No other C₉ aromatic hydrocarbons were detectable in the product mixture.

Example 13

Example 12 was repeated except that:

(1) the feed was t-butylbenzene;
(2) the temperature was 240–245° C.; and (3) the weight ratio of catalyst to hydrocarbon feed was 1:13.4.

The liquid product was analysed by mass spectra. The conversion of the feed was 11.2 percent and the yield of $C_{11}H_{16}$ products was 27.6 percent. These were identified as being a mixture of m- and p-t-butyltoluenes.

The foregoing examples demonstrate that cobalt, nickel and cobalt-nickel containing Fischer-Tropsch composites are useful catalysts for the methylation process of the present invention. The corresponding metal-metal hydride components per se, especially in comminuted form, are also effective catalysts.

What is claimed is:

1. The process for the methylation of an aromatic feed which comprises reacting carbon dioxide and hydrogen with the feed by contacting a mixture of said reactants with a catalyst selected from the group consisting of the reduced oxides or borides of cobalt or nickel or a mixture of cobalt and nickel, said contacting being at a temperature in the range from about 150° C. to 450° C. and at a pressure in the range from about 1.7 to 70 atmospheres, wherein for each mol of the feed said mixture contains an amount of carbon dioxide in the range from about 0.5 to 50 mols and for each mol of carbon dioxide an amount of hydrogen in the range above 1 and below 3 mols, said feed consisting essentially of one or more compounds of the formula $$C_6H_{5-m}(CH_3)_mR, \ C_6H_{5-(m+n)}(NH_2)(CH_3)_mR_n,$$
$$\text{and } C_5H_{5-(m+n)}N(CH_3)_mR_n,$$

wherein R is an alkyl group having a carbon atom content in the range from 1 to about 12 and m and n are the same or different and are 0 or 1.

2. The process as in Claim 1 wherein said feed is an alkylbenzene.

3. The process as in Claim 1 wherein said feed is a pyridine.

4. The process as in Claim 1 wherein said R is methyl.

5. The process as in Claim 1 wherein said catalyst is a cobalt-thoria-magnesia composite deposited upon kieselguhr, wherein said temperature is in the range from about 200–300° C., wherein said pressure is in the range from about 5 to 50 atmospheres, wherein said feed to carbon dioxide mol ratio is in the range 20 to 40, and wherein said carbon dioxide-hydrogen mol ratio is in the range 1 to 1–2.5, respectively.

6. The continuous process for the methylation of toluene which comprises introducing a feed consisting essentially of toluene, carbon dioxide and hydrogen into contact with a cobalt-thoria-magnesium oxide composite deposited upon kieselguhr at a temperature of about 250° C., at a contact time of about 12 minutes, and at a pressure of about 10 atmospheres; wherein for each mol of toluene, said feed contains about 40 mols of carbon dioxide and about 30 mols of hydrogen.

7. The continuous process for the methylation of pyridine which comprises introducing a feed consisting essentially of pyridine, carbon dioxide and hydrogen into contact with a cobalt-thoria-magnesium oxide composite deposited upon kieselguhr at a temperature of about 250° C., at a contact time of about 12 minutes, and at a pressure of about 10 atmospheres; wherein for each mol of pyridine, said feed contains about 40 mols of carbon dioxide and about 30 mols of hydrogen.

References Cited

Cady et al.; Ind. Eng. Chem., vol. 45, pp. 350–53 (1953).

HARRY I. MOATZ, Primary Examiner

U.S. Cl. X.R.

260—671 M